United States Patent [19]
Robbins

[11] 3,792,720
[45] Feb. 19, 1974

[54] DIAPHRAGM VALVE

[75] Inventor: James F. Robbins, Westford, Mass.

[73] Assignee: Sybron Corporation, Rochester, N.Y.

[22] Filed: May 9, 1972

[21] Appl. No.: 251,757

Related U.S. Application Data

[63] Continuation-in-part of Ser. No. 93,137, Nov. 27, 1970, Pat. No. 3,727,623.

[52] U.S. Cl.......... 137/625.28, 137/625.33, 251/14, 251/331, 251/61.1
[51] Int. Cl............................ F16k 7/16, F16k 7/17
[58] Field of Search 251/61.1, 14, 331; 137/625.33, 137/625.28

[56] References Cited
UNITED STATES PATENTS

| R19,151 | 5/1934 | Saunders | 251/331 |
|---|---|---|---|
| 2,907,346 | 10/1959 | Fortune | 251/331 X |
| 3,023,996 | 3/1962 | Robertson | 251/14 |

FOREIGN PATENTS OR APPLICATIONS

| 571,050 | 5/1924 | France | 251/331 |

*Primary Examiner*—Arnold Rosenthal
*Attorney, Agent, or Firm*—Theodore B. Roessel; James A. Rich

[57] ABSTRACT

A diaphragm valve is provided with means to prevent wrinkling of the diaphragm and to accurately control the flow through the valve. The valve has a body with at least one substantially flat valve seat on an exterior surface. Passages extend from an inlet chamber to the valve seats and from the valve seats to an outlet chamber. Each valve seat is covered by a diaphragm, overlying and extending beyond the valve seat, which in turn is covered by a cap. The caps and diaphragms define control cavities overlying the valve seats which may be pressurized to force the diaphragms against the valve seats. Preferably, at least one of the caps supports a mechanical flow regulator which comprises a flexible backing member and means for moving the backing member towards and away from the valve seat, thereby controlling the freedom of movement of the diaphragm in the control cavity. Also, the diaphragm is preferably pretensioned and a rigid reinforcing member adapted to bear at least part of the tension in the diaphragm is attached to a portion of the diaphragm which extends beyond the valve seat.

20 Claims, 6 Drawing Figures

PATENTED FEB 19 1974 3,792,720

DIAPHRAGM VALVE

RELATED APPLICATION

This application is a continuation-in-part of my copending application Ser. No. 93,137, filed Nov. 27, 1970 now U.S. Pat. No. 3,727,623.

BACKGROUND OF THE INVENTION

This invention relates to a diaphragm valve and more particularly to a fluid pressure operated diaphragm valve.

One common type of diaphragm valve utilizes a body with an inlet port or chamber, an outlet port or chamber, and a number of small passageways from both ports to at least one side of the body. A diaphragm is pressed by control fluid pressure behind the diaphragm against the side of the body to close the valve, and permitted to flex away from the side of the body to permit fluid to flow from the inlet port through the small passageways to the outlet port. Typical valves of this type are shown in U.S. Pat. No. 2,353,143-Bryant; U.S. Pat. No. 2,786,642-Comb; U.S. Pat. No. 2,818,880-Ratelband; U.S. Pat. No. 2,877, 791-Rich; U.S. Pat. No. 2,988,103-Canvasser and U.S. Pat. No. 3,092,144-Green.

Since the diaphragms in valves of this type only have to bridge small openings, the need for rigidity and strength in the diaphragm is reduced. As a result, these valves offer better seals and less likelihood of diaphragm rupture. However, the use of softer diaphragms makes the diaphragm susceptible to wrinkling. As a result, most valves of this type are provided with tubular, spherical, or other types of curved valve seats over which the diaphragms can be stretched slightly. This reduces wrinkling, but providing curved valve seats adds to the cost of manufacturing the valve.

Another cause of diaphragm wrinkling is the use of mechanical flow regulators, such as those shown in the application referred to above and in Saunders U.S. Pat. Nos. 1,800,157 and Re 19,151. The use of mechanical flow regulators with fluid pressure actuation provides precise flow control while still retaining the ability to turn the valve on and off quickly and easily through the use of fluid pressure. However, when these prior art mechanical flow regulators, which generally do not provide uniform support for the diaphragm through their entire range of movement, are used in connection with the softer diaphragms preferred in fluid pressure operated valves, some parts of the diaphragms are likely to be excessively deformed under certain operating conditions.

SUMMARY OF THE INVENTION

It an object of this invention to provide a fluid pressure operated diaphragm valve, with a substantially flat seat, in which diaphragm wrinkling is materially reduced.

Another object of this invention is to provide a diaphragm valve that may be operated by fluid pressure or mechanical regulators without excessive local deformation of the diaphragm.

A still further object of this invention is to provide a diaphragm valve with a mechanical flow regulator that provides uniform support for the diaphragm over the entire range of movement of the regulator.

The invention provides a diaphragm valve with a body having at least one substantially flat exterior surface having a valve seat thereon, at least one passage from an inlet chamber to the valve seat, and at least one passage from the valve seat to an outlet chamber. A diaphragm overlies the valve seat and a cap overlies the diaphragm. The cap and diaphragm define a control cavity which also overlies the valve seat. Means are provided for adding control fluid to the cavity to press the diaphragm against the valve seat. A mechanical flow regulator is mounted in the control cavity. This flow regulator comprises a flexible backing member, interposed between the diaphragm and the cap, and means for moving the flexible backing member towards and away from the valve seat. Thus, the flexible backing member controls the freedom of movement of the diaphragm in the control cavity and thereby provides a means for precisely controlling flow through the valve. In addition, the flexible backing member provides support for the diaphragm, which reduces wrinkling problems.

Another object of the invention is to reduce diaphragm wrinkling in a fluid pressure operated valve with a substantially flat valve seat by pretensioning the diaphragm. The diaphragm extends beyond the valve seat and at least one rigid reinforcing member is attached to a portion of the diaphragm extending beyond the valve seat. This rigid reinforcing member bears part of the tension in the diaphragm, thereby providing the strength needed to withstand the tension without tearing or otherwise damaging the diaphragm while still retaining the advantages of a softer diaphragm in the central portion over the valve seat.

Other objects and advantages of this invention will be apparent from the following description.

DETAILED DESCRIPTION

Figure 1:
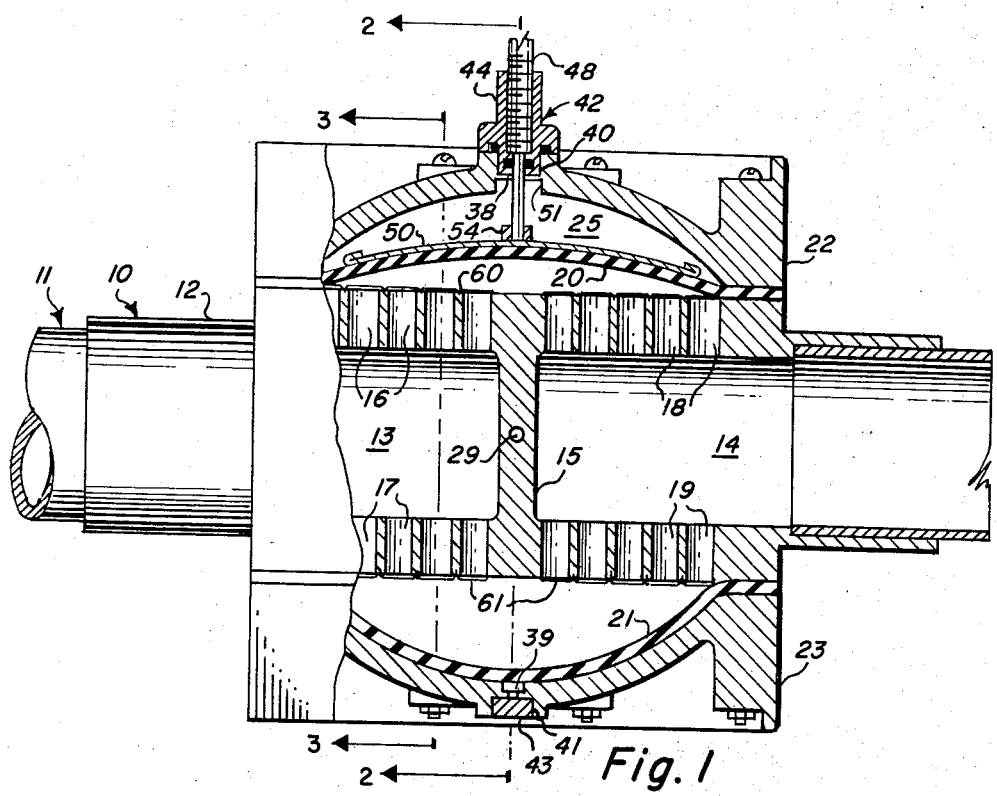
FIG. 1 is a partially sectioned side elevation view of one embodiment of this invention.

FIG. 1 shows a valve 10 embodying this invention installed in a pipe line 11 in which fluid is flowing from left to right. The valve has a body 12 containing an inlet port or chamber 13 and an outlet port or chamber 14. The two chambers 13 and 14 are separated by a central divider 15.

Flow passages 16 extend from inlet chamber 13 to a substantially flat valve seat 60 on the upper side of body 12. Another set of flow passages 17 extend from the inlet chamber to a second substantially flat valve seat 61 on the bottom side of body 12. Since the valve seats are substantially flat, the valve body can be produced, for example, by molding, for less than a body with curved valve seats could be. It should be clear that the term "substantially flat" is intended to encompass valve seats with minor irregularities, such as the ridges around the individual openings shown in the copending application referred to above. As used herein, a substantially flat valve seat is a valve seat that lies generally in one plane, as opposed to a tubular, spherical or other curved surface.

Figure 3:
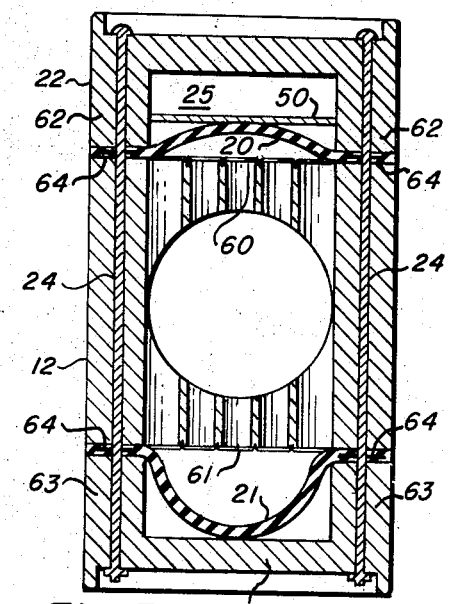

Valve seats 60 and 61 are covered by flexible diaphragms 20 and 21 which are preferably made of an elastomeric material such as natural rubber, urethane rubber, silicone rubber, neoprene, buna-N, or NORDEL, a hydrocarbon rubber produced by duPont. The best material for any particular application will depend upon operating conditions such as the fluid being handled, the pressure and the frequency of cycling. Diaphragms 20 and 21 are held in place by an upper cap 22 and a lower cap 23. As shown in FIG. 3, the caps 22 and 23 and diaphragms 20 and 21 are secured to the body by bolts 24 that extend through the valve from top to bottom.

The upper and lower caps 22 and 23 and diaphragms 20 and 21 are secured to the body by bolts 24 that extend through the valve from top to bottom.

Figure 2:
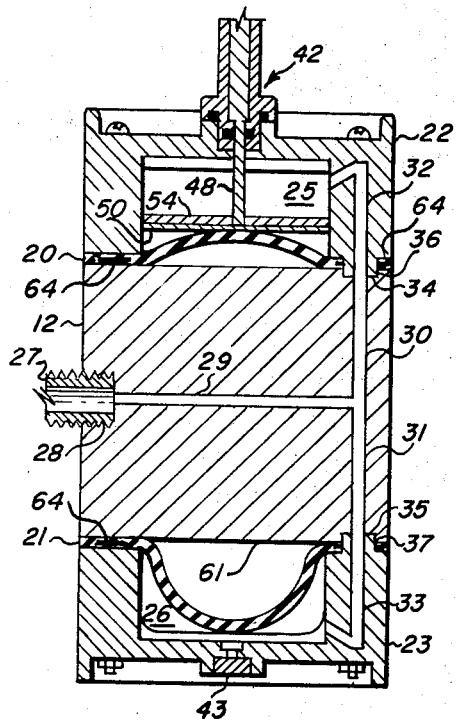
FIGS. 2 and 3 are cross-sectional views of the valve shown in FIG. 1.

The upper and lower caps 22 and 23 and diaphragms 20 and 21 define control cavities 25 and 26 respectively. The cavities may be pressurized with a control fluid to close the valve. Referring to FIG. 2, the control fluid is supplied through a line 27 inserted in a threaded port 28 in valve body 12. From port 28, the control fluid passes through a passage 29 that extends through the central divider 15 of body 12 to two branch passages 30 and 31 that lead to the top and bottom of the valve body 12. These branch passages 30 and 31 connect with passages 32 and 33 through the upper and lower caps 22 and 23 that carry the control fluid to cavities 25 and 26.

Branch passages 30 and 31 open into recesses 34 and 35 in the top and bottom of the valve body. The caps 22 and 23 have bosses 36 and 37 that extend through holes in the diaphragms 20 and 21 into these recesses. The bosses ensure that the diaphragms do not block the control fluid passages and also serve to help align the diaphragms during assembly of the valve.

The drawings depict the valve as it would be with fluid flowing in the pipeline and with no pressure in the control cavities. Thus, the lower diaphragm 21 is free to flex into cavity 26, thereby permitting the fluid in pipeline 11 to flow from the inlet chamber 13 through passages 17 and then back through passages 19 to the outlet chamber 14. As can be seen in FIGS. 1-3, both control cavities 25 and 26 have a concave vertical cross-section in the direction of fluid flow through the valve and a rectangular vertical cross-section in the direction transverse to fluid flow through the valve. The concave cross-section in the direction of fluid flow promotes smooth flow through the valve and thereby reduces the pressure drop. However, since the cap is only curved in one direction, it can be produced for less than a cap with curves in all directions, such as a spherical cap, could be.

The upper diaphragm 20 can flex part way into cavity 25; however, the amount of movement of this diaphragm is limited by a mechanical flow regulator 42 mounted in the top cap. The regulator has a flexible backing member 50, which can be moved toward and away from valve seat 60, thereby limiting the freedom of movement of the top diaphragm 20 and restricting the flow through the upper set of passages 16 and 18. The flexible backing member 50 is preferably a thin sheet of spring metal, such as phosphor bronze.

As can be seen in FIG. 1, when the mechanical flow regulator is in the partially open position it provides uniform support for the diaphragm over substantially the entire length of the control cavity. Thus, the softer diaphragms preferred for fluid pressure operation can be used with this regulator without excessive localized deformation of the diaphragm. When the regulator is moved to the fully open position, shown in FIG. 4, the flexible backing member bends to conform to the top of the control cavity, thereby permitting substantially full flow through the upper set of passages 16 and 18.

Figure 4:
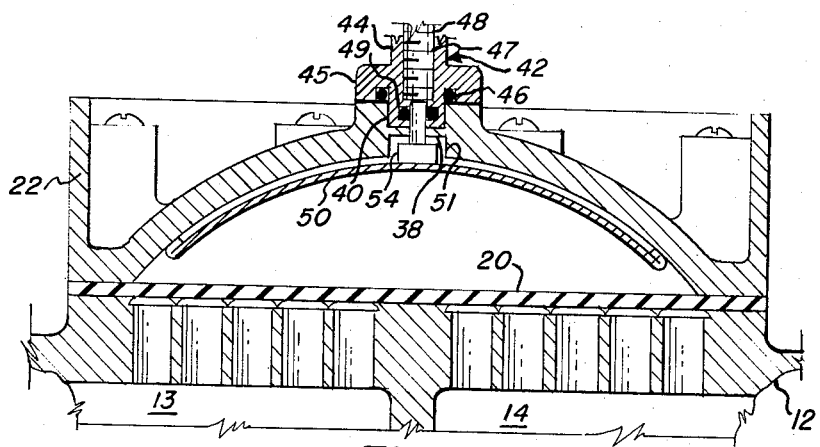
FIG. 4 is an enlarged sectional view of the top cap and flow regulator of the valve shown in FIG. 1, taken from the same viewing point as in FIG. 1.

The means for moving the flexible backing member 50 towards and away from valve seat 60 is best seen in FIGS. 1, 2 and 4. Referring to these Figures, stepped bores 38 and 39 extend through the upper and lower caps 22 and 23. The largest portion 40 and 41 of each bore 38 and 39 is threaded so that either a flow regulator 42 or a plug 43 may be mounted in either cap. In the valve shown in FIGS. 1 and 2, a flow regulator 42 is mounted in the upper cap 22 and a plug 43 is used to close off the bore 39 in lower cap 23. If greater flexibility of flow control is desired, flow regulators may be mounted in both caps.

Flow regulator 42 has a body 44, the lower portion of which is threaded to engage the threaded portion 40 of bore 38. As best seen in FIG. 4, the body 44 has a flange 45 that is grooved to accept an O-ring 46 which provides a fluid tight seal between the cap 22 and the regulator body 44.

A bore 47 extends through the regulator body 44. The upper portion of bore 47 is threaded and a shaft 48, having at least one threaded end, is mounted in bore 47 and extends through the bore 38 in the cap into the control cavity 25. As shown in FIG. 4, there is a groove in the lower part of bore 47 and an O-ring 49 in the groove which provides a fluid tight seal between shaft 48 and the regulator body 44.

A rigid reinforcing bar 54 is attached, as by soldering, to the back side of the flexible backing member 50. This strengthens the central portion of the backing member, which is furtherest from the cap when the regulator is in the closed or partially opened positions; and also provides means for exerting increased pressure on the diaphragm in the area between the two sets of passages 18 and 19, thereby promoting more positive sealing of the valve with the mechanical regulator. In addition, the rigid reinforcing bar 54 provides a handy means for attaching shaft 48 to the flexible backing member 50. The shaft 48 is attached to the reinforcing bar 54 so that the shaft may rotate without turning the bar. Rotation of the shaft causes it to reciprocate in bore 38 and thereby moves the flexible backing member towards or away from valve seat 60.

In order to provide maximum flow through the valve, a channel 51, extending across the control cavity 25, is provided in the top of the cap. Bore 38 opens into this channel. The bar 54 may be retracted into channel 51, which allows the entire length of the flexible backing member 50 to conform to the top of the control cavity 25.

Another feature of this valve which helps prevent diaphragm wrinkling is a pretensioned diaphragm. Referring to FIG. 3, diaphragms 20 and 21 extend beyond valve seats 60 and 61 into the spaces, between the sides 62, 63 of the caps 22, 23 and the valve body 12, through which the mounting bolts 24 extend. Rigid reinforcing members 64, which are preferably flat metal strips, are attached to the portions of the diaphragm that extend beyond the valve seats into these spaces.

Figure 5:
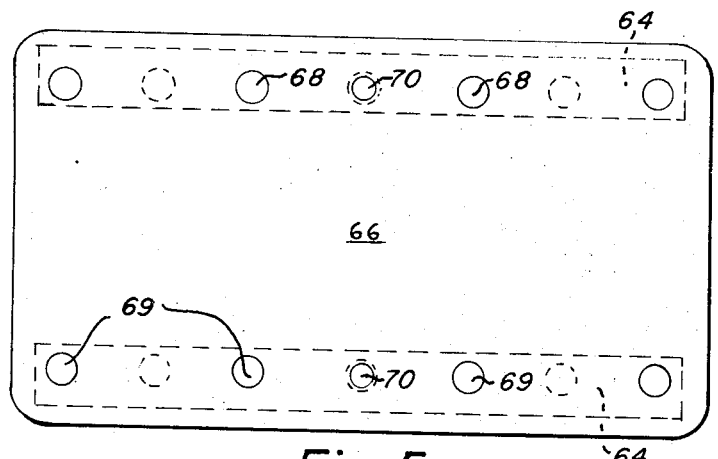
FIG. 5 is a detailed view of one of the diaphragms used in this embodiment.
Figure 6:
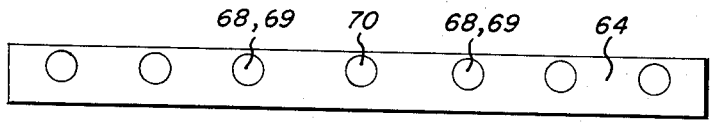
FIG. 6 is a detailed view of one of the reinforcing members used with the diaphragm shown in FIG. 5.

Referring to FIGS. 5 and 6, the diaphragms 20, 21 comprise molded, generally rectangular sheets 66 of elastomeric material. The reinforcing strips 64 are molded into the longer sides of the diaphragm. Two roles of holes 68, 69, substantially equally spaced along these sides, extend through the diaphragms and through the flexible reinforcing strips 64. The bolts 24 that mount the caps, diaphragms and reinforcing strips to the valve body extend through these holes. Additional holes 70 are provided to accommodate the bosses 36, 37 on the caps through which the control fluid passages extend.

The reinforcing strips provide the diaphragm with the strength needed to withstand the strains imposed by pretensioning the diaphragm without stiffening the central portion of the diaphragms that overly the valve seats. Thus, relatively soft diaphragms can be used, which makes it easier to seal the valve with relatively low control fluid pressures.

Preferably, the diaphragm is pretensioned by molding sheet 66 with the two rows of mounting holes 68, 69 closer together than the two rows of bolt holes through the caps and valve body. The diaphragms are then stretched laterally, i.e., transverse to the direction of fluid flow or the longitudinal axis of the diaphragm and cap, to fit the bolts 24. This pretensions the diaphragm in the transverse direction while leaving the diaphragm substantially free from tension in the longitudinal direction. It has been found that, with this valve, effective seals can be achieved without longitudinal pretensioning. Since the control cavity has a concave cross-section in the longitudinal direction, excessive deformation of the diaphragm is not as likely to occur in this direction. Furthermore, any wrinkles that do occur will extend generally in the transverse direction. When the valve is closed, these wrinkles will be pushed towards the ends of the control cavities. Thus, the center of the diaphragm, under which any fluid must pass to leak through the valve, remains wrinkle free.

The amount of pretensioning desired will depend chiefly on the amount of set that develops in the diaphragm with repeated stretching. With NORDEL hydrocarbon rubber, for example, acceptable results have been obtained when the diaphragm is initially stretched by approximately 18 percent. In other words, when the sheet is molded the distance between the two rows of mounting holes 68, 69 should be approximately 85 percent of the distance between the two rows of mounting holes through the caps 22, 23 and body 12 of the valve. The amount of pretensioning needed with other diaphragm materials can be readily determined from published literature on rubber set points.

It should be clear that those skilled in the art may make many modifications to the valve described above within the scope of this invention. For example, a regulator body with a smooth bore and a smooth shaft may be used in connection with an automatic valve positioner. This type of regulator is particularly suited for use in automated systems. If a valve that can be switched back and forth rapidly, to provide fluid at a variety of pre-set flow rates is desired, the control passages in the body may be omitted or relocated and the two remaining sides of the body may be provided with flow passages and with caps, diaphragms, individual control fluid supply lines and flow regulators to control flow through them. In this manner, four individually controlled flow paths may be provided. The valve may be used to supply fluid at a variety of pre-set flow rates by adjusting the flow regulators and then supplying control fluid to various combinations of the individual caps. If greater flexibility is required, valve bodies with six, eight or more sides can be used. These and many other modifications may be made within the scope of this invention, which is defined by the appended claims.

I claim:

1. A diaphragm valve comprising:
   a. a body having at least one substantially flat exterior surface having a valve seat thereon, at least one passage from an inlet chamber to the valve seat, and at least one passage from the valve seat to an outlet chamber;
   b. a diaphragm overlying said valve seat;
   c. a cap overlying the diaphragm, said cap and said diaphragm defining a control cavity overlying the valve seat with a bore extending through the top of the cap into the control cavity;
   d. means for adding control fluid to the cavity to press the diaphragm against the valve seat; and
   e. a mechanical flow regulator comprising a flexible backing member interposed between the diaphragm and the top of the cap, regulator body mounted in the bore in the cap and having a threaded bore extending therethrough, and a shaft having at least one threaded end that extends through the threaded bore in the regulator body, the other end of said shaft being connected to the flexible backing member so that the shaft can rotate relative to the backing member, whereby rotating the shaft in the threaded bore reciprocates the shaft and moves the backing member towards and away from the valve seat, thereby controlling the freedom of movement of the diaphragm in the control cavity.

2. A diaphragm valve comprising:
   a. a body having at least one substantially flat exterior surface having a valve seat thereon, at least one passage from an inlet chamber to the valve seat, and at least one passage from the valve seat to an outlet chamber;
   b. a diaphragm overlying said valve seat;
   c. a cap overlying the diaphragm, said cap and said diaphragm defining a control cavity overlying the valve seat with a transverse channel in the cap extending across the top of the cavity and a bore extending through the top of the cap and opening into said transverse channel;
   d. means for adding control fluid to the cavity to press the diaphragm against the valve seat;
   e. a mechanical flow regulator comprising a flexible backing member interposed between the diaphragm and the top of the cap and a rigid reinforcing bar attached to the back side of said flexible backing member, said rigid reinforcing bar being adapted to be retracted into said transverse channel; and
   f. means for moving the backing member towards and away from the valve seat, thereby controlling the freedom of movement of the diaphragm in the control cavity, comprising a shaft attached to said rigid reinforcing bar and extending through the bore in the top of the cap and means for reciprocating the shaft within the bore.

3. A diaphragm valve comprising:
 a. a body having at least one substantially flat exterior surface having a valve seat thereon, at least one passage from an inlet chamber to the valve seat, and at least one passage from the valve seat to an outlet chamber;
 b. a diaphragm overlying said valve seat;
 c. a cap overlying the diaphragm, said cap and said diaphragm defining a control cavity overlying the valve seat, said control cavity having a concave vertical cross-section in the direction of fluid flow through the valve and a rectangular vertical cross-section in the direction transverse to fluid flow through the valve;
 d. means for adding control fluid to the cavity to press the diaphragm against the valve seat; and
 e. a mechanical flow regulator comprising a flexible backing member interposed between the diaphragm and the top of the cap and means for moving the backing member towards and away from the valve seat, thereby controlling the freedom of movement of the diaphragm in the control cavity.

4. A diaphragm valve comprising:
 a. a body having at least one substantially flat exterior service having a valve seat thereon, at least one passage from an inlet chamber to the valve seat and at least one passage from the valve seat to an outlet chamber;
 b. a pretensioned diaphragm overlying and extending beyond the valve seat with at least one rigid reinforcing member attached to a portion of the diaphragm that extends beyond the valve seat, said rigid reinforcing member being adapted to bear at least part of the tension in the diaphragm;
 c. a cap overlying the diaphragm, said cap and said diaphragm defining a control cavity overlying the valve seat;
 d. means for adding control fluid to the cavity to press the diaphragm against the valve seat; and
 e. a mechanical flow regulator comprising a flexible backing member interposed between the diaphragm and the top of the cap and means for moving the backing member towards and away from the valve seat; thereby controlling the freedom of movement of the diaphragm in the control cavity.

5. A diaphragm valve according to claim 4, wherein the diaphragm and cap are attached to the body by mounting members that extend through holes in the portion of the diaphragm that extends beyond the valve seat.

6. A diaphragm valve according to claim 5, wherein the diaphragm comprises a sheet of molded elastomeric material and the rigid reinforcing member comprises a metal strip molded into said sheet.

7. A diaphragm valve according to claim 6, wherein the mounting members extend through holes in the metal strip.

8. A diaphragm valve according to claim 5, wherein the diaphragm is generally rectangular and the mounting holes are substantially equally spaced along the longer sides of the diaphragm.

9. A diaphragm valve according to claim 8, wherein the control cavity has a concave vertical cross-section in the direction of fluid flow through the valve and a rectangular vertical cross-section in the direction transverse to fluid flow through the valve.

10. A diaphragm valve according to claim 9 wherein the diaphragm is pretensioned in the direction transverse to fluid flow through the valve and substantially free from tension in the direction of fluid flow through the valve.

11. A diaphragm valve according to claim 4 wherein there are a plurality of small passages from the inlet chamber to the valve seat and a plurality of small passges from the valve seat to the outlet chamber.

12. A fluid pressure operated diaphragm valve comprising:
 a. a body having at least one substantially flat exterior surface having a valve seat thereon, at least one passage from an inlet chamber to the valve seat, and at least one passage from the valve seat to an outlet chamber;
 b. a pretensioned diaphragm overlying and extending beyond the valve seat; and
 c. at least one rigid reinforcing member attached to a portion of said diaphragm that extends beyond said valve seat, said rigid reinforcing member being adapted to bear at least part of the tension in the diaphragm.

13. A fluid pressure operated diaphragm valve according to claim 12, wherein a cap overlies said diaphragm and the diaphragm and cap are attached to the body by mounting members that extend through mounting holes in the portion of the diaphragm that extends beyond the valve seat.

14. A fluid pressure operated diaphragm valve according to claim 13, wherein the diaphragm comprises a sheet of molded elastromeric material and the rigid reinforcing member comprises a metal bar molded into said sheet.

15. A fluid pressure operated diaphragm valve according to claim 14 wherein the mounting members extend through mounting holes in the metal strip.

16. A fluid pressure operated diaphragm valve according to claim 13 wherein the diaphragm is generally rectangular and the mounting holes are substantially equally spaced along the longer sides of the diaphragm.

17. A fluid pressure operated diaphragm valve according to claim 16 wherein the cap defines a control cavity having a concave vertical cross-section in the direction of fluid flow through the valve and a rectangular vertical cross-section in the direction transverse to fluid flow through the valve.

18. A fluid pressure operated diaphragm valve according to claim 17 wherein the diaphragm is pretensioned in the direction transverse to fluid flow through the valve and substantially free from tension in the direction of fluid flow through the valve.

19. A fluid pressure operated diaphragm valve according to claim 12 wherein there are a plurality of small passages from the inlet chamber to the valve seat and a plurality of small passages from the valve seat to the outlet chamber.

20. A fluid pressure operated diaphragm valve according to claim 12 wherein a cap overlies the diaphragm, the cap and the diaphragm define a control cavity overlying the valve seat, and means are provided for adding control fluid to the cavity to press the diaphragm against the valve seat.

* * * * *